US005742335A

United States Patent [19]
Cannon

[11] Patent Number: 5,742,335
[45] Date of Patent: Apr. 21, 1998

[54] EXAMINATION SYSTEM FOR ARCHITECTURAL STRUCTURE EXTERIORS

[76] Inventor: Michael W. Cannon, P.O. Box 624, Hampshire, Ill. 60140

[21] Appl. No.: 503,929

[22] Filed: Jul. 19, 1995

[51] Int. Cl.⁶ ........................................................ H04N 7/18
[52] U.S. Cl. ............................. 348/135; 348/82; 348/139
[58] Field of Search ................................ 348/81, 82, 135, 348/139, 164, 128, 165; 73/762, 783, 786, 789, 790, 791, 800; 250/330, 342, 358.1

[56] References Cited

U.S. PATENT DOCUMENTS

| | | | |
|---|---|---|---|
| 4,495,518 | 1/1985 | Sanoian | 358/113 |
| 4,647,220 | 3/1987 | Adams et al. | 374/5 |
| 4,910,593 | 3/1990 | Weil | 358/113 |
| 4,913,558 | 4/1990 | Wettevik et al. | 358/113 |
| 4,999,614 | 3/1991 | Ueda et al. | 340/588 |
| 5,005,083 | 4/1991 | Grage et al. | 358/161 |
| 5,111,048 | 5/1992 | Devitt et al. | 250/342 |
| 5,386,117 | 1/1995 | Piety et al. | 250/330 |
| 5,416,315 | 5/1995 | Filipovich | 250/358.1 |

OTHER PUBLICATIONS

Proceedings (from) Seminar on Jun. 12, 1996 (report No. 16) City of Chicago Maintenance of Exterior Walls and Enclosures Ordinance. By The Chicago Committee on High Rise Buildings.

*Primary Examiner*—Tommy P. Chin
*Assistant Examiner*—Anand Rao
*Attorney, Agent, or Firm*—Foley & Lardner

[57] ABSTRACT

Detailed images of problem areas occurring in the surface of a structure, such as a multiple story building, are obtained by infrared and visual spectrum cameras positioned proximate to the problem area. A remote camera records a reference field of view that includes the local cameras and their operator, such that the area of interest may be positioned on the surface of the building. A helmet camera worn by the operator records the detailed images and transmits them to a base location.

5 Claims, 3 Drawing Sheets

EXAMINATION SYSTEM FOR ARCHITECTURAL STRUCTURE EXTERIORS

TECHNICAL FIELD OF THE INVENTION

The present invention relates in general to the detection of defects in buildings and other large manmade structures, and more particularly to methods and apparatus of structural defect detection using visual and infrared cameras.

BACKGROUND OF THE INVENTION

For years, property owners have waged a battle with structural degradation caused by weathering, erosion, poor repair, and settlement. Detection of these problems has proven to be problematic. Many different kinds of services have been employed by owners and managers of structures to understand, evaluate and rectify structural defects.

One conventional approach is to videotape a structure, looking for problems to rectify. While videotaping structures using both visual and infrared spectra is helpful and informative, the conventional, ground-level processes used for capturing the infrared and visual spectrum images are insufficient because of their poor attained resolution. According to one conventional method, ground based video capture equipment is used which, when viewing an entire tall building, either has severe perspective problems or, as used from a remote vantage point to take an image of an entire elevation, has insufficient resolution to identify the location and nature of discovered defects.

These conventional building exterior inspection methods have been less than successful in identifying problem areas. An ideal identification and recordation system would be able to identify problem areas of any structure. These problem areas may result from water leakage, air infiltration, heat and cold loss, vinyl shrinkage around windows, voids in caulking, deterioration of metal, weathering of exterior stone and mortar joints, corrosion due to air pollution, fissures in brick and stone, and even saturation of stone materials by water.

SUMMARY OF THE INVENTION

The present invention provides an improved building exterior inspection method by employing at least one camera that is proximate to the area to be inspected and a further, remote camera that captures a reference image in its field of view. This reference field of view includes the area of which the proximate or local camera is making a detailed image, as well as a sufficient number of like areas around it to provide a frame of reference. In this manner, the local camera, which is within the reference field of view of the remote camera, can be located on the surface of the building. At each of a plurality of times, a detailed image of a respective area and a corresponding reference image is captured. A plurality of composite images is assembled, one for each of these times, from respective ones of the captured detailed images and the captured reference images. In this way, a visual record is established which is able to show a possible problem area in great detail, as well as the location of this problem area on, e.g., the face of a building.

Preferably, two local cameras are used: a visual-spectrum camera and an infrared spectrum camera which capture cognate images of the area of interest. The composite frame for this local area would thus include a detailed visual spectrum image, a detailed infrared spectrum image, and a frame of reference image that is of larger scale.

In a preferred embodiment, the local infrared camera and the local visual-spectrum camera are mounted on a helmet that is worn by a photographer or camera operator. The photographer ascends or descends the exterior of the building or structure so as to be proximate to the area to be inspected, using such means as a boatswain chair or a swing stage. The helmet preferably includes a view finder marked on a transparent visor. Merely by looking at a particular area, the photographer can direct the local infrared and visual spectrum cameras to capture detailed images of that location. Video signal transmitters coupled to these cameras are mounted on the helmet. Video signals are transmitted by the transmitters and received by respective signal monitors at a ground station. For each time, which may be ascertained by way of a time stamp, a signal mixing unit combines frames from the local visual spectrum camera, the local infrared spectrum camera and a typically ground based, remote frame-of-reference camera to produce a split-screen video frame. A succession of these frames creates a motion picture or "movie" describing each area of interest on the surface of the building. Preferably, the helmet worn by the local video photographer includes an audio head set and transmitter, by which means the photographer can give an audio commentary on the area which he or she is inspecting. This audio signal is transmitted to a ground audio receiver and its signal is recorded and mixed by the signal mixing unit to provide a voice over or audio track to the motion picture, making the result an audiovisual work.

In a preferred embodiment, the remote camera is also employed to obtain a vertical reference against which the drift of the building, or degree to which the building is out of plumb, might be measured. Preferably, this vertical reference is a simple plumb bob, line and target. A processor coupled to the signal mixing unit derives a vertical axis from the plumb line image and from this is able to selectively superimpose a succession of vertical planes through the building image. This can be used to determine whether or not the building is out of plumb or level.

The above method and apparatus of the invention provide several technical advantages over building inspection methods known in the art. First, a very detailed visual and audio record can be made of a building surface or "skin" without the problems of distance or bad perspective associated with ground-based thermography techniques. The present invention permits a sufficiently close inspection and analysis of the structure surface that problems concerning falling debris and the like can be predicted in advance of their occurrence.

Further, if several records of the building surface are compiled over time, the present invention permits their comparison to show the effects of aging, weathering, ice, heat and cold on structural materials over time. Empirical evidence of these effects, if gathered, would be superior to data obtained from test laboratories concerning the durability of such materials under nonregional environmental conditions (microclimates). Comparing video records of the same area taken, say, one year apart may show the speed at which deterioration is progressing and thus permit a prediction of time of failure.

Another technical advantage of the invention is that the cameras capturing the local visual-spectrum and infrared images are being directed by a person in proximity to the areas being recorded. Such a person, if he or she has experience with building inspection and with structural problems, may more intelligently direct the cameras to problem areas than would be possible by a "drone" or automatic method. Because the invention permits the making of a permanent record of the structure surface, the time and expense involved in lowering further building inspectors down the sides of buildings are reduced.

While the present invention has particular application to multiple story office buildings, it can be used equally as well for any structure, particularly large ones having surface areas that are relatively inaccessible. These include homes, bridges, tunnels and dams. As prepared by the apparatus of the invention, records of the exterior surfaces of buildings may be advantageously used by several classes of businesses and individuals. For example, property insurance underwriters could obtain hard evidence concerning the exterior condition of the property of the insured, so that the risk of falling debris and the like can be properly assessed. For financial institutions and others securing loans with real estate, a record assembled according to the invention can provide evidence of the exterior condition of the building. This will have an effect on the value of the collateral.

Other businesses and organizations will have an interest in the long-term effects of the environment on their building products. These include chemical companies involved in the production of structural sealants, trade councils investigating different construction techniques, architectural firms having an interest in determining how their designs withstand the environment, and contractors and subcontractors who have an interest in the longevity of their construction techniques. Finally, the owners themselves of such structures will have an interest in determining the relative integrity of the exteriors of their buildings.

BRIEF DESCRIPTION OF THE DRAWINGS

Further aspects of the invention and their advantages will be discerned with reference to the following drawings, in which like characters denote like components and in which:

FIG. 2b is a left elevational view of the helmet camera shown in FIG. 2a;

DETAILED DESCRIPTION OF THE INVENTION

Figure 1:
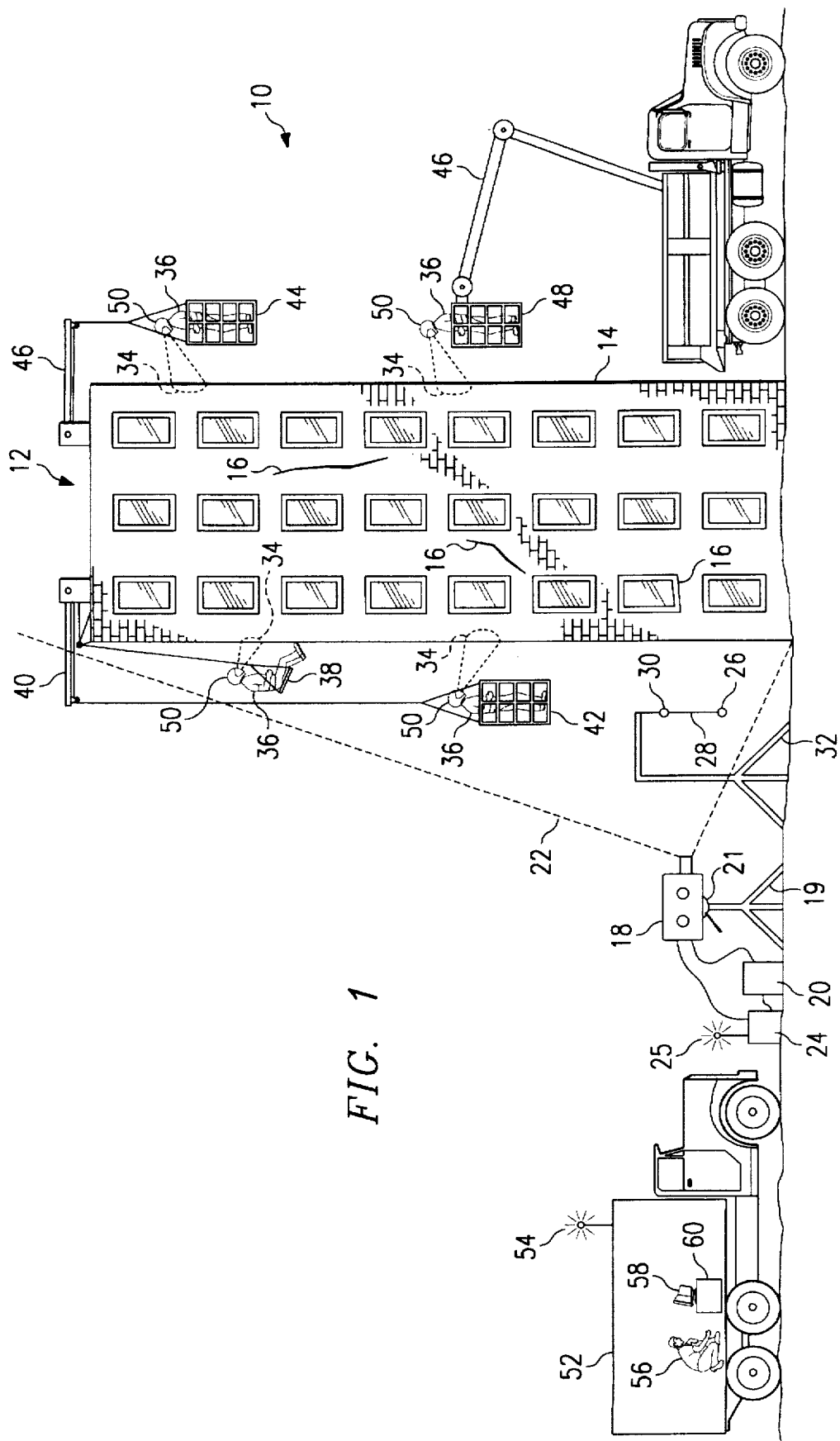
FIG. 1 is a schematic diagram showing the different components of the invention in use during examination of a structure.

Referring first to FIG. 1, a system according to the invention is indicated generally at 10. System 10 is designed to record remote and local images of a structure, such as building 12. The present invention has particular application to multiple story or other large structures, the exterior surfaces of which are relatively inaccessible. Building 12 has an exterior surface 14, typically a facade of stone, glass, metal or some combination of these, and has a plurality of stories. A plurality of defects 16 may occur in the surface 14, such as masonry cracks, caulking or mortar voids, vinyl window seal shrinkages and other artifacts of exposure of the surface 14 to the environment, as have been described in the background of the invention.

According to the invention, a remote camera 18, which preferably is a visual-spectrum CCD camera, is positioned at a location remote from the surface 14, typically on the ground. A battery 20 is connected to the camera 18 to supply power thereto. Camera 18 is pointed and adjusted so as to have a reference field of view indicated schematically by dashed lines at 22, which typically will include the entirety of a building as visible from the camera 18. Surface 14 includes a plurality of areas, one or more of which may have a detectable building defect, as will be explained below. The remote camera 18 is further connected to a transmitter 24 which is operable to transmit a video signal captured by the camera 18. Power to the transmitter 24 is supplied by the battery 20.

In a preferred embodiment of the invention, a vertical reference is placed within the reference field of view 22 so as to be captured by the remote camera 18. In the illustrated embodiment, this vertical reference is a simple plumb bob 26, plumb line 28 and target 30, all as suspended from a plumb bob stand 32. As will be explained below, line 28 in particular is used to acquire a vertical reference to determine whether or not the building 12 is out of plumb or level, and the degree of drift of building 12 if any.

According to the invention, a photographer or camera operator, who preferably is a person with experience in inspecting building facades, is positioned in proximity to an area 34 on the building 12 for which a detailed image is to be acquired. FIG. 1 illustrates four alternative methods of positioning an operator 36 to be proximate an area of interest 34. Typically, only one of these methods of positioning would be used at any one time. Importantly, the remote camera 18 is so situated that its field of view, also termed the reference field of view, includes the operator 36. In this way, the position of the operator 36 with respect to the building 12 can be ascertained, and therefore the position of the area of interest 34.

One method of positioning the operator 36 with respect to area of interest 34 is a boatswain chair 38 which typically is suspended from the roof of the building 12. Alternatively, the operator 36 may be placed within a swinging man basket 42 that is also suspended from the top of the building, as by means of boom 40. In a third method, a two-person swing stage 44 may be used, although only one operator 36 in stage 44 has been shown for clarity. This is suspended from the top of the building 12 by a boom 46. For low to mid-rise buildings or sections of same, a cherry picker 46 may be used, in which the operator 36 is extended close to the area of interest 34 in the basket 48 of the cherry picker 46.

In each case, the operator 36 is wearing a helmet camera indicated schematically at 50, which will be described in greater detail in conjunction with FIGS. 2a and 2b. The cameras mounted on helmet 50 (as will be described below) are operable to capture infrared and visual-spectrum images of the area of interest 34 in a great level of detail.

Another component of the system of the invention is a remote recording vehicle 52 which is in range of wireless communication with the helmet camera 50 and the remote camera transmitter 24. The remote recording vehicle 52 has one or more antennas 54 for the purpose of receiving signals from the remote camera 18 and the helmet camera 50. A specialist 56 can view and hear the video and audio feeds in real time with the aid of an audio transceiver (described below) and a plurality of monitors, indicated schematically by a single monitor 58. Sufficient equipment exists within the vehicle 52 to record each of the video and audio signals, as represented by processing equipment 60.

The camera 18 is mounted on a tripod 19 having a leveling platform 21, similar to a transit. This is used for accurate disposition of the camera 18 while making its recording of the elevation of the building 12. The position of the camera 18 can be photogrammetrically determined and recorded for later use. The antenna 25 can be of the carotid type. Battery 20 is preferably used as the power supply for camera 18 because of the typical lack of convenient AC power sources in open landscapes.

Figure 2A:
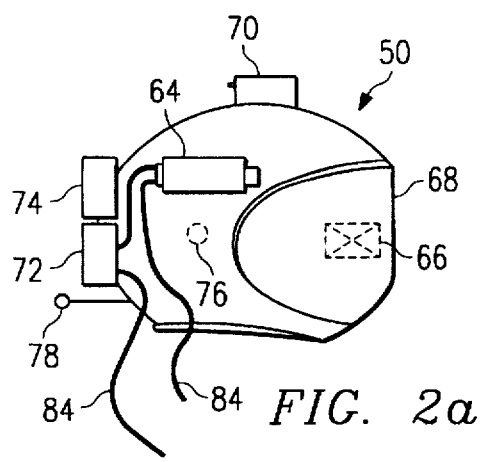
FIG. 2a is a right elevational view of a helmet camera according to a preferred embodiment of the invention.
Figure 2B:
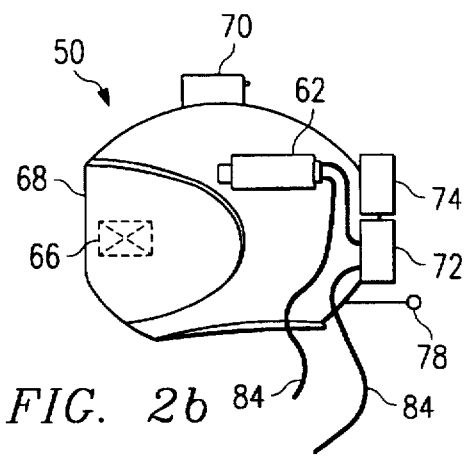
Figure 3:
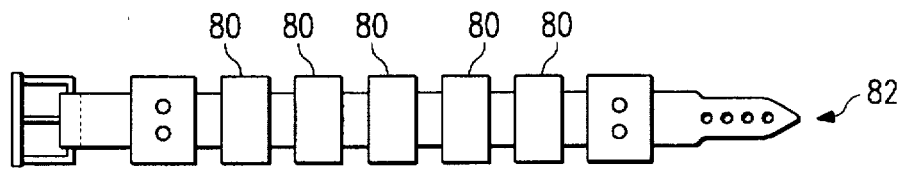
FIG. 3 is a schematic view of a battery belt for use with the helmet camera shown in FIGS. 2a and 2b.

Referring now to FIGS. 2a and 2b, a helmet 50, or "helmet cam", has mounted on its left side an infrared CCD camera 62. Mounted on the opposite side of the helmet 50 is a visual-spectrum CCD camera 64. Cameras 62 and 64 are so aligned that their fields of view are centered on the same local area 34 of the surface 14 (FIG. 1). So that the operator 36 (FIG. 1) may ascertain which local area cameras 62 and 64 are recording, a view finder, schematically represented at 66, is inscribed on a visor 68 of the helmet 50. This frames the local area being recorded, and permits the operator to direct the cameras 62 and 64 to areas, such as are showing structural defects, which may be of particular interest to the operator.

The helmet 50 further has mounted thereon a dual plane gyroscope 70 which is provided to retard any angular movement of the helmet 50 and therefore the head of the operator. The infrared camera 62 is connected to a first video transmitter 72, here shown mounted on the rear of the helmet 50, while the visual spectrum local camera 64 is connected to a transmitter 74. The helmet 50 also includes an internal audio headset, indicated schematically by its earphone at 76, for picking up the voice of the operator and transducing it into an audio signal which is transmitted by an connected omnidirectional antenna 78 connected thereto.

In the illustrated embodiment, power to the various apparatus mounted on the helmet camera 50 is provided by batteries 80 that are mounted on a battery belt 82, in turn worn by the operator. Power supply leads 84 (FIGS. 2a and 2b) connect the power source of batteries 80 with the helmet 50. The transmitters 72 and 74 can be of the short-range variety. The double plane gyroscope 70 includes a battery-powered motor (not shown) having an adjustment for rotational force. Power connections to the helmet 50 through wires 84 can be of the standard phonograph type for purposes of safety and replacement. The helmet cam 50 is sized to be small enough to be worn in any type of climbing and descending apparatus contemplated for use with the invention, various ones of which have been described in conjunction with FIG. 1. The helmet cam 50 is a highly portable arrangement for the camera equipment. Power for the dual plane gyroscope 70 and the audio headset 76 may be supplied by batteries separate from the battery belt 82.

Figure 4:
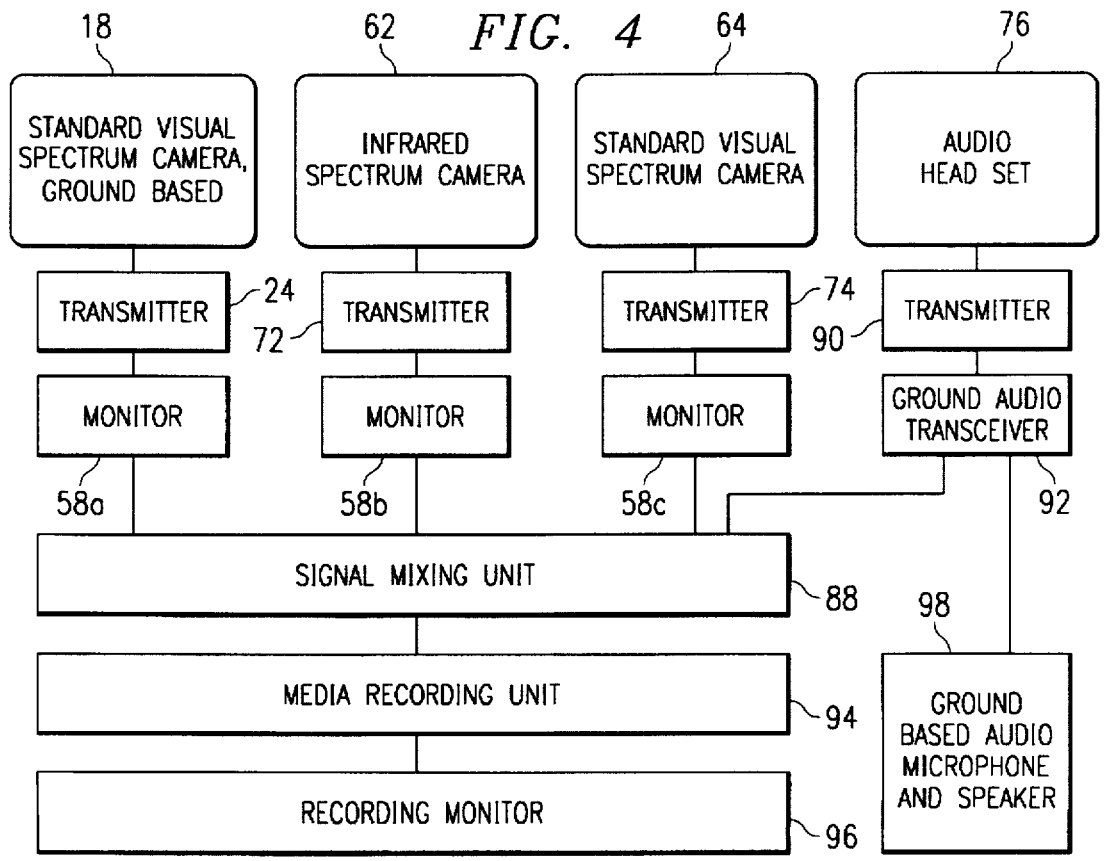
FIG. 4 is a schematic diagram showing different electronic components of the invention and the signal paths therebetween.

The communication pathways among various components of the invention are illustrated in FIG. 4. Remote camera transmitter 24 transmits a reference field of view image signal to a monitor 58a, which will be understood by persons of ordinary skill in the art to include a receiving antenna and a receiver, as well as other conventional video signal processing and storing electronics. In like manner, the infrared spectrum camera 62 sends an infrared local image signal to transmitter 72, which in turns transmits a wireless signal to monitor 58b. Simultaneously, transmitter 74 transmits a visual spectrum local image signal to monitor 58c. Each of these video signals is in turn sent to a signal mixing unit 88.

As above mentioned, in the preferred embodiment of the invention, the helmet 50 includes an audio headset 76, which provides an audio signal to a transmitter 90. The transmitter transmits an audio signal on omnidirectional antenna 78 (FIGS. 2a and 2b) to a ground audio transceiver 92. Audio transceiver 92 is in turn capable of transmitting an audio signal back to the headset 76 so that the operator proximate to the area of interest and the specialist inside the mobile vehicle may communicate. Transceiver 92 sends its audio signal to the signal mixing unit 88. The signal mixing unit 88 is operable to create a split-screen image including a wide or reference field of view containing an entire elevation of the building as well as the vertical frame of reference, a local field of view displaying an infrared image of an area to be examined, and substantially the same local field of view showing an image from the visual portion of the spectrum. The video feeds from monitors 58a, 58b and 58c are synchronized such that the split screen image developed by the signal mixing unit 88 is derived from images that were acquired at the same time. An audio voice over is added from the ground audio transceiver 92.

The signal mixing unit 88 furnishes a composite image to a media recording unit 94. As will be understood by those skilled in the art, media recording unit 94 records both video and audio portions. The composite image may be monitored using a recording monitor 96. The specialist communicates with the operator on an audio link through a ground base audio microphone and speaker 98. The split-screen image created by signal mixing unit 88 allows a viewer to more instantly associate the location, visual problem identification and associated infrared signature with each other.

Figure 5:
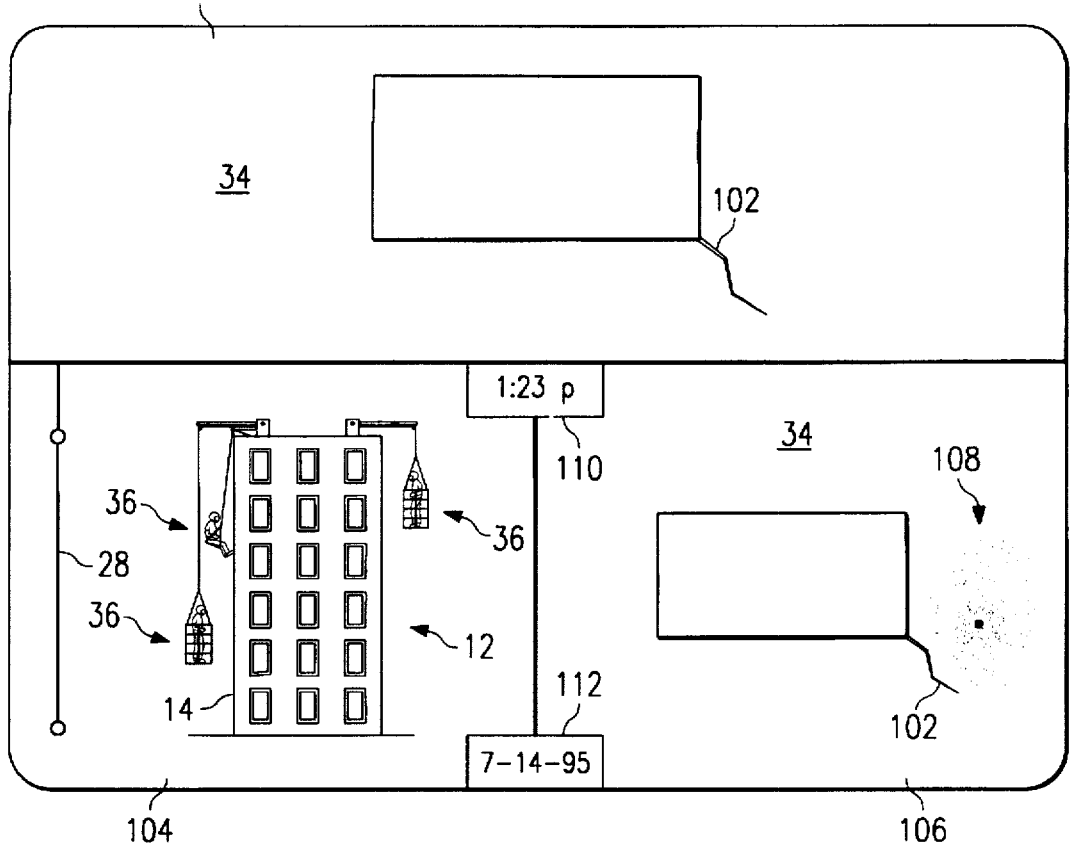
FIG. 5 is a schematic diagram of a split-screen video image assembled according to the invention.

FIG. 5 is an illustration of a single frame of a motion picture produced as a result of a building inspection using the method of the invention. The single frame includes an upper portion 100 which is derived from a local visual spectrum image provided by local camera 64 (FIG. 2a). Visual spectrum image 100 shows a defect 102 which is not visible from the ground.

The lower left hand portion 104 is a reference image which shows the reference field of view from the remote camera 18. The field of view captures an operator 36 proximate the surface 14 of the building 12 and the vertical reference or plumb line 28. A lower right hand portion 106 of the composite frame is derived from the local, detailed image acquired by infrared CCD camera 62 (FIG. 2b). This not only shows the imperfection 102, but a farther imperfection 108, also not visible from the ground. The view shown in portion 106 corresponds to the view shown in portion 100. The split screen image is completed with a time stamp 110 and a date stamp 112, both added to the composite image by signal mixing unit 88. The time stamp 110 and the date stamp 112 are added at the time of recording of the structure in the mobile recording vehicle 52 (FIG. 1).

For each defect discovered during the inspection, an icon can be placed upon the building 12 at the approximate location of the defect. Such an icon can, for example, be a time and/or date stamp as schematically shown. The capture of vertical reference 28 permits the generation of a plurality of vertical planes parallel to reference 28, each of which may be superimposed on the reference building image in the manner shown. The capture of the vertical line 28 also permits the generation of a horizontal plane 118 that is orthogonal to both it and the vertical plane 114. This may be used to determine whether or not the building 12 is level.

In an exemplary operation of the inspection method of the invention, an operator may descend down the side of an office building in a boatswain chair, looking for problems in the structure. All the information which the operator sees is also seen by both the visual spectrum and infrared local cameras on the helmet 50. The video photographer has the opportunity to stop his or her descent alongside of the building at any given time to make measurements and to give commentary on any observed problem. This audio commentary is continually received in the mobile recording vehicle 52. The specialist 56 has the opportunity to tell the operator to stop his or her descent if received data requires further clarification.

Figure 6:
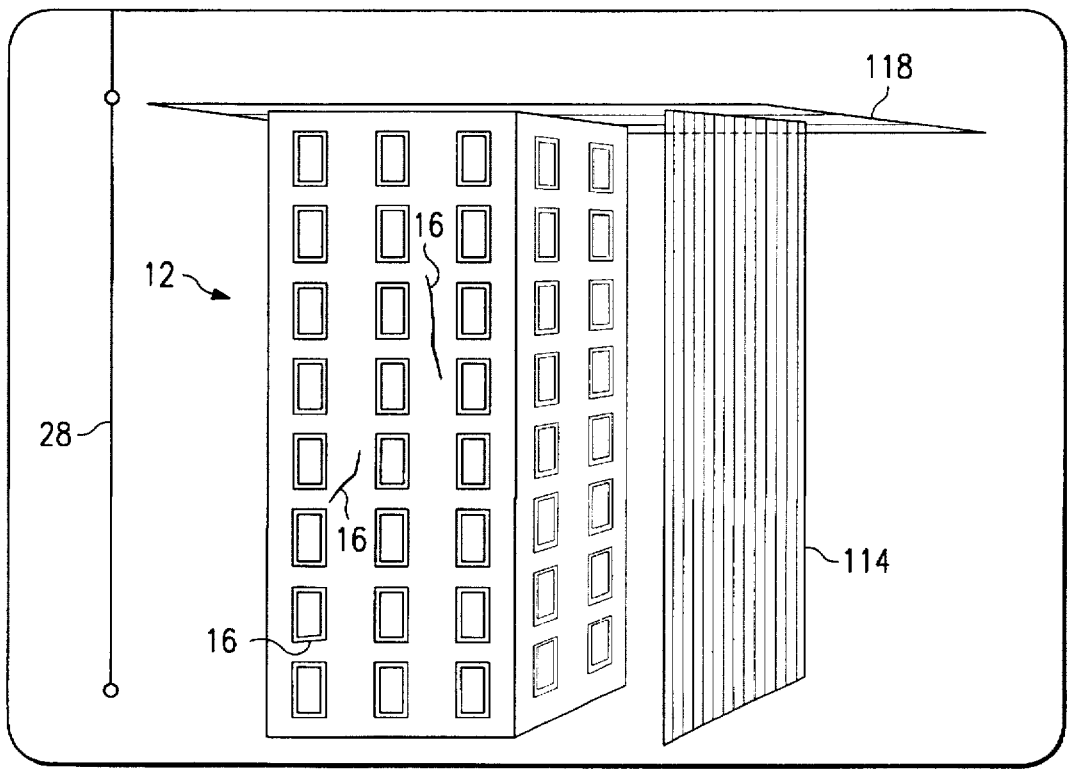
FIG. 6 is a schematic diagram of a representative frame of a completed audiovisual work, illustrating the superposition of a vertical plane on a reference image of a building.

The ground-based remote camera 18 is set up at a point that has a predetermined relationship to the building 12, as is determined by photogrammetry. The sequences recorded permit a three dimensional rendering of the structure 12 later in CAD/CAM computer processing environment. The structure can be positioned by the CAD/CAM equipment at a center point in a spatial field. By using the captured plumb line 28 and a measurement to the building 12, this structure 12 can be plumbed, leveled and squared by using transparent vertical and horizontal planes, as has been described for FIG. 6.

The vertical and horizontal planes may be rendered opaque so that, as they are moved with respect to the image of the building 12, cusps or protruding points will appear or pierce through the plane, thus identifying structural elements which are not coplanar with other structural elements in the figure.

The video and audio information acquired during the inspection is recorded using the mixing method and apparatus above described to produce a series of split screen frames having time and date signatures. The time and date stamps affixed to each frame have several uses. First, they establish a time during which the frame was recorded. Second, the time and date stamp allows an easy way of searching through the records for the editing of sequences, in the instance where all frames would not be used in a finished audiovisual product. Third, because the operator is moving across the building as the recording continues, the time and date stamp permits the operator to approximate a physical location on the building by the time in which the frame was recorded.

The specialist 56 notes all of the problem areas at the time that the recording is made. These problems areas will be pulled from the recorded material and saved by a computer video editing program. A predetermined sequence header and transition to the next sequence will be added to a copy of the material.

In a representative audiovisual work, an introduction may comprise an elevational view of the structure. The initial structure image may be rotated and the above-described vertical and horizontal planes moved through it. In a next sequence of the audiovisual work, various highlights of the structure will be imaged in a split-screen format. In a third sequence of the audiovisual work, the entire recorded project may be viewed by selecting a limited number of frames from the thirty frames per second originally recorded. For example, three out of thirty frames per second can be selected for inclusion into the finished audiovisual work, which typically shows the operator going over the entirety of the building surface. Compression is thus achieved by deleting frames. The finished "movie" may be recorded in any conventional tangible medium of expression, such as VHS videotape, and delivered to the client.

In one embodiment, the end user may access segments of the original, thirty frame per second video by pointing to an icon located on the image of the building elevation in the initial photogrammetry sequence. The user may hear the corresponding audio commentary at that point. In another embodiment, 30 frame/sec. video segments corresponding to any icon (or other area) are prepared by the video specialist from the basic recording when the client indicates an interest in that area.

As different sides of the building are inspected, the remote camera 18's position is changed such that an elevational view of the structure 12, including the operator 36, is kept in view at all times. In one inspection method, boatswain chair information capture can commence from the upper left section of the front elevation of the structure 12. The operator descends in the boatswain chair straight down for its entire length, the chair is displaced counterclockwise on the building or rightward, and another vertical descent is initiated. In this way, the entire exterior surface of the building 12 is done in vertical stripes.

According to a further aspect of the invention, the specialist 56 may color code problem areas according to their severity at the time that they are being recorded. For example, a problem area time stamped in red might be used to indicate that a brick is loose and is about to fall off the structure, requiring mediate attention. A time stamp of yellow may be used if it is found that vinyl is shrinking around a window, but without the infrared signature of air leakage, indicating a condition which may be a problem in the future. A green time stamp may be used to indicate a local area which shows no defects at the present time but bears watching in the future.

In summary, a novel method of building inspection has been shown and described. Visual spectrum and infrared local cameras capture detailed images of various areas of the external surface of the structure, while a remote camera captures a reference field of view including the operator, who is proximate the area on e.g. a side of a building. The reference field of view also captures a vertical reference such as a plumb line for later image processing of the video recording. A helmet camera according to the invention permits the disposition of the infrared and visual spectrum cameras at a location proximate to the area of concern, thus avoiding problems of distance and perspective. The transmitters associated with these cameras transmit infrared and visual spectrum image signals back to a ground-based location. From these cameras, the remote camera and the image processing equipment, a sequence of split-screen images can be developed which will show detailed images of all problem areas on a structure and will provide a frame of reference concerning the location of these problem areas. The assembled record may then be used for repair, for structure evaluation and as a historical record to show aging and weathering effects.

While a preferred embodiment of the present invention has been described in the above detailed description in conjunction with the appended drawings, the invention is not limited thereto but only by the scope and spirit of the appended claims.

I claim:

1. Apparatus for detecting, locating and recording defects in a plurality of areas of a surface of a structure comprising:
   a local infrared camera for capturing a detailed image of a selected one of said plurality of areas, a transmitter coupled to said local infrared camera generating or transmitting a detailed infrared image signal;
   a remote camera for capturing a reference image of a reference field of view including said selected one of said plurality of areas and sufficient other ones of said areas of said surface that a reference is provided for the spatial location of said selected one of said areas on said surface of said structure, a transmitter coupled to said remote camera for transmitting a reference image signal, said remote camera adaptable to be positioned farther away from said selected one of said areas than said local camera;

means for receiving said detailed image signal and said reference image signal;

means for attributing a time when said detailed image signal was captured and when said reference image was captured;

means coupled to said means for receiving and said means for attributing for generating a composite image including, for a particular time, a respective detailed image and a reference image;

a local visual-spectrum camera for capturing a local visual-spectrum image of said selected one of said areas of said surface of said structure, a transmitter coupled to said local visual-spectrum camera for transmitting a detailed visual-spectrum image signal, said means for receiving operable to receive said detailed visual-spectrum image signal, said means for generating a composite image incorporating a detailed visual-spectrum image derived from said detailed visual-spectrum signal; and a helmet adaptable to be worn by a photographer, said local visual-spectrum camera and said local infrared camera mounted on said helmet to be positioned proximate to said selected one of said plurality of areas and adaptable to be repositioned to be proximate to other ones of the plurality of areas, said local visual-spectrum camera and said local infrared camera being aligned by said helmet to be adaptable to be pointed at said selected one of said plurality of areas by the photographer.

2. The apparatus of claim 1, wherein said helmet further comprises a transparent visor having marked thereon a view finder, said view finder permitting the photographer to identify the area for which the detailed infrared image and the detailed visual-spectrum image are being captured, said view finder permitting the photographer to turn his or her head to redirect the local infrared camera and the local visual-spectrum camera to another of said areas of said surface.

3. The apparatus of claim 1, wherein said helmet further comprises a two-plane gyroscope adaptable to retard angular movement of said helmet so that the transition between one of said plurality of areas and a next one of said plurality of areas is gradual.

4. The apparatus of claim 1, wherein said helmet further comprises said transmitters coupled to said local infrared and local visual-spectrum cameras.

5. The apparatus of claim 1, wherein said helmet further comprises an audio pickup adaptable to capture audio commentary of the photographer as detailed images of areas are being captured, an audio transmitter coupled to said audio pickup generating an audio signal in response to said audio pickup; and said means for receiving including an audio signal receiver and recorder, said means for generating a composite image coupled to said audio signal receiver and operable to create an audiovisual work including said composite image and a phonorecord of said audio signal.

* * * * *